US006999127B2

(12) United States Patent
Ryoo et al.

(10) Patent No.: US 6,999,127 B2
(45) Date of Patent: Feb. 14, 2006

(54) APPARATUS AND METHOD FOR IMAGE CONVERSION AND AUTOMATIC ERROR CORRECTION FOR DIGITAL TELEVISION RECEIVER

(75) Inventors: Dong Wan Ryoo, Taejon (KR); Hyung Jik Lee, Taejon (KR); Jeun Woo Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 581 days.

(21) Appl. No.: 10/327,881

(22) Filed: Dec. 26, 2002

(65) Prior Publication Data

US 2003/0210348 A1    Nov. 13, 2003

(30) Foreign Application Priority Data

May 10, 2002    (KR) ................... 10-2002-0025851

(51) Int. Cl.
    *H04N 11/20*    (2006.01)
(52) U.S. Cl. ............... 348/441; 348/445; 348/446; 348/557; 345/604; 382/309; 714/758; 714/800; 714/801
(58) Field of Classification Search ............... 348/441, 348/444, 445, 466, 555–557, 659–661; 345/603–604; 382/309; 714/746, 758, 800, 801
    See application file for complete search history.

(56) References Cited

U.S. PATENT DOCUMENTS

| | | | | |
|---|---|---|---|---|
| 4,117,458 A | * | 9/1978 | Burghard et al. ............ 714/753 |
| 4,965,717 A | * | 10/1990 | Cutts et al. .................... 714/12 |
| 5,289,277 A |  | 2/1994 | Blanchard et al. |
| 5,442,400 A | * | 8/1995 | Sun et al. ............... 375/240.15 |
| 5,446,744 A | * | 8/1995 | Nagasawa et al. .......... 714/755 |
| 5,530,484 A | * | 6/1996 | Bhatt et al. ................. 348/556 |
| 6,037,989 A | * | 3/2000 | Kim ............................ 348/441 |
| 6,177,922 B1 | * | 1/2001 | Schiefer et al. ............. 345/698 |
| 6,310,659 B1 | * | 10/2001 | Glen ........................... 348/589 |
| 6,404,817 B1 |  | 6/2002 | Saha et al. |

(Continued)

FOREIGN PATENT DOCUMENTS

KR    100196927    2/1999

(Continued)

*Primary Examiner*—Brian Yenke
(74) *Attorney, Agent, or Firm*—Mayer, Brown, Rowe & Maw LLP

(57) ABSTRACT

Disclosed is an apparatus and method for image conversion and automatic error correction for a digital television receiver (TV) which can improve the picture quality by converting an image signal for a TV or PC that displays an image having an RGB format into an image signal of YPbPr for the digital TV and automatically correcting an error produced in the received image signal. The apparatus includes an image receiving and converting section for converting an image receiving and converting section for converting received RGB image data into image data of a digital TV format and rearranging parity bits and error information bits produced from the converted image data to form one image signal, a storage and image providing section for receiving the image signal from the image receiving and converting section, storing the image signal in a memory bank and providing the image signal so as to detect and correct an error produced in the image signal, and an error correcting and outputting section for receiving the image signal from the storage and image providing section, correcting the error by computing the parity bits and the error information bits from the original image data of the image signal, and interpolating the image to match a 16:9 aspect ratio for the digital TV.

9 Claims, 5 Drawing Sheets

U.S. PATENT DOCUMENTS

| | | | |
|---|---|---|---|
| 6,441,857 B1 * | 8/2002 | Wicker et al. | 348/441 |
| 6,449,017 B1 | 9/2002 | Chen et al. | |
| 6,456,340 B1 * | 9/2002 | Margulis | 348/745 |
| 6,577,348 B1 * | 6/2003 | Park | 348/554 |
| 6,710,817 B1 * | 3/2004 | Oku et al. | 348/569 |
| 6,757,026 B1 * | 6/2004 | Joo | 348/581 |
| 2002/0008780 A1 * | 1/2002 | Han | 348/554 |
| 2002/0013929 A1 * | 1/2002 | Maciver | 714/800 |
| 2002/0118296 A1 * | 8/2002 | Schwab et al. | 348/441 |
| 2003/0206242 A1 * | 11/2003 | Choi | 348/441 |
| 2004/0170317 A1 * | 9/2004 | Pettigrew et al. | 382/162 |

FOREIGN PATENT DOCUMENTS

| | | |
|---|---|---|
| KR | 1020000015461 | 3/2000 |
| KR | 10-1993-0004027 | 7/2000 |

* cited by examiner

| GRAPHIC DATA BITS | PARITY BITS | ERROR INFORMATION BITS | TOTAL |
|---|---|---|---|
| 24 Bits(D0-D23) | 5 Bits(P0-P4) | 3 Bits(N0-N2) | 32 Bits |

(b)

| BIT POSITION | DATA /PARITY | PARITY VALUE | BIT POSITION | DATA /PARITY | PARITY VALUE |
|---|---|---|---|---|---|
| 0 | P0 | 1 | 16 | D11 | 17 |
| 1 | P1 | 2 | 17 | D12 | 18 |
| 2 | P0 | 3 | 18 | D13 | 19 |
| 3 | P2 | 4 | 19 | D14 | 20 |
| 4 | D1 | 5 | 20 | D15 | 21 |
| 5 | D2 | 6 | 21 | D16 | 22 |
| 6 | D3 | 7 | 22 | D17 | 23 |
| 7 | P3 | 8 | 23 | D18 | 24 |
| 8 | D4 | 9 | 24 | D19 | 25 |
| 9 | D5 | 10 | 25 | D20 | 26 |
| 10 | D6 | 11 | 26 | D21 | 27 |
| 11 | D7 | 12 | 27 | D22 | 28 |
| 12 | D8 | 13 | 28 | D23 | 29 |
| 13 | D9 | 14 | 29 | N0 | 30 |
| 14 | D10 | 15 | 30 | N1 | 31 |
| 15 | P4 | 16 | 31 | N3 | 32 |

FIG.3

P0 = XOR-GATING OF 24-BIT IMAGE DATA
(D0,D1,D3,D4,D6,D8,D10,D11,D13,D15,D17,D19,D21,D23)

P1 = XOR-GATING OF 24-BIT IMAGE DATA
(D0,D2,D3,D5,D6,D9,D10,D12,D13,D16,D17,D20,D21)

P2 = XOR-GATING OF 24-BIT IMAGE DATA
(D1,D2,D3,D7,D8,D9,D10,D14,D15,D16,D17,D22,D23)

P3 = XOR-GATING OF 24-BIT IMAGE DATA
(D4,D5,D6,D7,D8,D9,D10,D18,D19,D20,D21,D22,D23)

P4 = XOR-GATING OF 24-BIT IMAGE DATA
(D11,D12,D13,D14,D15,D16,D17,D18,D19,D20,D21,D22,D23)

FIG.4

N0 = XOR GATING
   (24-BIT IMAGE DATA SET AND 5 PARITY BITS)

N1 = XOR GATING
   (24-BIT IMAGE DATA SET AND 5 PARITY BITS)

N2 = XOR GATING
   (24-BIT IMAGE DATA SET AND 5 PARITY BITS)

FIG.5

| PARITY VALUE | SS2 | SS1 | SS0 | ERROR INFORMATION |
|---|---|---|---|---|
| 0 | 0 | 0 | 0 | NO ERROR |
| Not 0 | 0 | 0 | 0 | PLURAL ERRORS |
| Not 0 | 0 | 0 | 1 | SINGLE ERROR: CORRECTION POSSIBLE |
| Not 0 | 0 | 1 | 0 | SIGNAL ERROR: CORRECTION POSSIBLE |
| Not 0 | 0 | 1 | 1 | PLURAL ERRORS: (2,4…) |
| Not 0 | 1 | 0 | 0 | SIGNAL ERROR: CORRECTION POSSIBLE |
| Not 0 | 1 | 0 | 1 | PLURAL ERRORS: (2,4…) |
| Not 0 | 1 | 1 | 0 | PLURAL ERRORS: (2,4…) |
| Not 0 | 1 | 1 | 1 | PLURAL ERRORS: (3,5…) |
| 0 | 0 | 0 | 1 | N0 ERROR: CORRECTION POSSIBLE |
| 0 | 0 | 1 | 0 | N1 ERROR: CORRECTION POSSIBLE |
| 0 | 0 | 1 | 1 | N1 ERROR: CORRECTION POSSIBLE |
| 0 | 0 | 1 | 1 | N1, N0 ERROR: CORRECTION POSSIBLE |
| 0 | 1 | 0 | 0 | N2 ERROR: CORRECTION POSSIBLE |
| 0 | 1 | 0 | 1 | N2, N0 ERROR: CORRECTION POSSIBLE |
| 0 | 1 | 1 | 0 | N2, N1 ERROR: CORRECTION POSSIBLE |
| 0 | 1 | 1 | 1 | N2, N1, N0 ERROR: CORRECTION POSSIBLE |

APPARATUS AND METHOD FOR IMAGE CONVERSION AND AUTOMATIC ERROR CORRECTION FOR DIGITAL TELEVISION RECEIVER

BACKGROUND OF THE INVENTION

1. Field of the Invention

The present invention relates to an image conversion and automatic error correction, and more particularly, to an apparatus and method for image conversion and automatic error correction for a digital television receiver (TV) which can improve the picture quality by converting an image signal for a TV or a personal computer (PC) that displays an image having an RGB format different from a digital TV into an image signal of YPbPr for the digital TV and by automatically correcting an error produced in the received image signal.

2. Background of the Related Art

General home automation and home theater provide services in an independent form, and are not compatible with other display appliances. However, with the explosive activation of the Internet, the spread of high-speed Internet has been increased, and there has been a general attempt to connect other display appliances with the Internet service. Accordingly, in a system such as a home server where a digital TV, Internet, home network, and automation function are integrated, it is necessary to integrate a digital TV signal and a general graphic signal. Since image data is inputted/outputted at a high speed and in a time-division manner, it is not easy to request retransmission of the data when an error is detected. Judging whether an error is produced in a received/transmitted image signal is called a parity check. The parity check checks and compensates for the error using parity bits in order to keep the accuracy of storage and transmission of the image signal.

Korean Patent No. 10-0196927 discloses an "Error correction method for a digital image signal recording/reproducing apparatus" which can perform an error correction of a larger amount of data in the same time period and reduce the time required for error-correcting data of one ECC block by performing an error correction operation with respect to a PO code word and then with respect to a PI code word. Also, this patent can improve a data processing speed since it can perform the error correction of a larger amount of data in the same time period. However, this patent has the problems in that the signal conversion is not considered.

Korean Patent No. 10-0262102 discloses a "Data receiving apparatus" for receiving data transmitted along with other information on the air. According to this patent, the data is displayed by binary output signals successively connected to a demodulator, and the respective data is composed of an information word and a test word. However, if a combination of at least two syndromes formed from a reliability word has a value of one row of a parity test matrix, the error correction is not performed.

Korean Patent No. 10-0283145 discloses an "Error correction method for a digital recording and reproducing apparatus" which can use dummy data for the error correction without removing the dummy data during a reproduction operation. However, this patent also has the problems in that the signal conversion is not considered.

SUMMARY OF THE INVENTION

Accordingly, the present invention is directed to an apparatus and method for image conversion and automatic error correction for a digital TV, which substantially obviates one or more problems due to limitations and disadvantages of the related art.

It is an object of the present invention to provide an apparatus and method for image conversion and automatic error correction for a digital television receiver (TV) which can provide an improved picture quality by converting an RGB graphic signal used in a general TV or a PC into an image signal of YPbPr suitable for the digital TV and by automatically correcting an error in the image signal.

It is another object of the present invention to provide an apparatus and method for image conversion and automatic error correction for a digital television receiver (TV) which can detect a double error, triple error or error beyond the triple error to prevent any wrong compensation, and does not require an additional memory by performing the error detection and compensation using 8 bits of the memory length resulting from subtraction of 24-bit image data from 32-bit memory length.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In order to achieve the above object, there is provided an apparatus for image conversion and automatic error correction for a digital television receiver (TV) including an image receiving and converting section for converting received RGB image data into image data of a digital TV format and rearranging parity bits and error information bits produced from the converted image data to form one image signal, a storage and image providing section for receiving the image signal from the image receiving and converting section, storing the image signal in a memory bank and providing the image signal so as to detect and correct an error produced in the image signal, and an error correcting and outputting section for receiving the image signal from the storage and image providing section, correcting the error by computing the parity bits and the error information bits from the original image data of the image signal, and interpolating the image to match a 16:9 aspect ratio for the digital TV.

Preferably, the image receiving and converting section includes a digital image signal converter for converting the input RGB image data into the YPbPr image data to match the digital TV format by using a matrix conversion, a parity-bit generation and data arrangement module for generating the parity bits by computing the image data if the image data is received from the digital image signal converter, generating the error information bits by computing the image data and the parity bits, and rearranging one image signal by the parity bits and the error information bits, and a graphic address generator for generating an address signal for storing the image signal in the memory.

Preferably, the error correcting and outputting section includes a first-in first-out (FIFO) module for interface for receiving the image signal, a parity-bit generator for receiving the image signal from the FIFO module and generating specified parity bits and error information bits from the image data, an error-bit detection-correction module for correcting the error of the image signal by computing the parity bits and the error information bits generated from the parity-bit generator and the parity bits and the error information bits generated from the image receiving and converting section, an interpolation processing module for receiving the corrected image signal from the error-bit detection-correction module and converting the image signal to match the aspect ratio of the digital TV, a digital TV address generator for generating an address signal, for outputting the error-corrected image signal to the digital TV, and a sync generator for generating a sync signal to be outputted to the digital TV.

In another aspect of the present invention, there is provided a method for image conversion and automatic error correction for a digital television receiver (TV) including a first step of receiving and converting image data of an RGB format into image data of an YPbPr format that is a digital TV format by a matrix conversion, a second step of generating parity bits and error information bits from the image data and storing the parity bits and the error information bits, a third step of reading the stored image signal through a memory controller, a fourth step of regenerating parity bits and error information bits from the image data of the image signal, a fifth step of obtaining parity values by computing the parity bits and the error information bits generated at the second step and the parity bits and the error information bits generated at the fourth step and correcting an error of a corresponding bit by the obtained parity values, and a sixth step of outputting the image signal error-corrected at the fifth step to the digital TV.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 2a and 2b are views illustrating a table of a 32-bit image signal according to the present invention.

FIG. 3 is a view illustrating computing of parity bits according to the present invention.

FIG. 4 is a view illustrating computing of error information bits according to the present invention.

FIG. 5 is a view illustrating a table of resultant values of error detection according to the present invention.

DETAILED DESCRIPTION OF THE PREFERRED EMBODIMENT

An apparatus and method for image conversion and automatic error correction for a digital TV according to the preferred embodiment of the present invention will now be explained in detail with reference to the accompanying drawings.

The present invention provides an improved picture quality by performing an image signal conversion and an automatic error correction when a set top box of the digital TV converts a graphic signal of a general TV into a signal of the digital TV, when an Internet TV, which can simultaneously perform functions of the digital TV and the Internet, converts an image provided from the Internet TV to the Internet into an image that can be viewed in the digital TV, or when it is required to convert an RGB image format into a YPbPr format of the digital TV.

Figure 1:
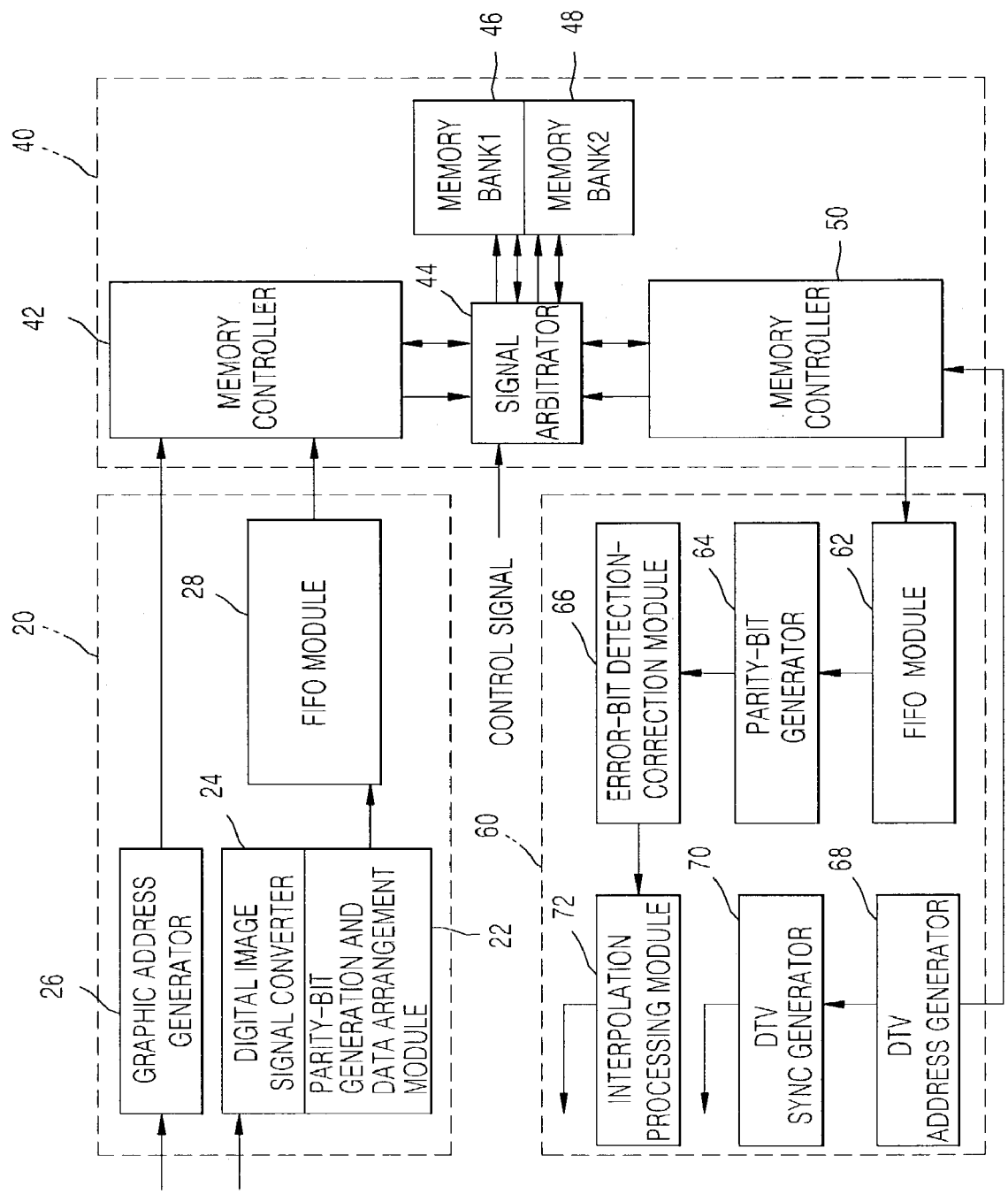
FIG. 1 is a block diagram of an apparatus for image conversion and automatic error correction for a digital TV according to the present invention.

FIG. 1 is a block diagram of an apparatus for image conversion and automatic error correction for a digital TV according to the present invention.

Referring to FIG. 1, the apparatus for image conversion and automatic error correction for a digital television receiver (TV) includes an image receiving and converting section 20 for converting RGB image data of 24 bits received from a graphic chip or a graphic module connected from a general computer to a monitor into image data of a YPbPr format and rearranging the converted image data to an image signal of 32 bits, a storage and image providing section 40 for storing the image signal converted into the YPbPr format and providing an image signal stored during an error detection and correction, and an error correcting and outputting section 60 for checking whether an error exists in the received image signal, automatically correcting the error, and converting the image signal to match an aspect ratio for the digital TV.

The image receiving and converting section 20 includes a digital image signal converter 24 for converting the input digital RGB image data of 24 bits outputted from the graphic card or the graphic module connected from the computer to the monitor into the digital YPbPr signal for the digital TV system, a parity-bit generation and data arrangement module 22 for generating the 5 parity bits for error detection and the 3 error information bits for correction from the 24-bit image data converted into the YPbPr format and rearranging the image signal by the parity bits and the error information bits, a graphic address generator 26 for storing the digital graphic image signal in a memory module, and a FIFO module 28 that is an interface for storing the converted and rearranged image signal in the memory.

The storage and image providing section 40 includes a memory controller 42 for storing the digital graphic image signal, a signal arbitrator 44 for arbitrating the signals so as to select one among the input signals, first and second memory banks 46 and 48 for storing the image signal, and a memory controller 50 for reading the stored image signal by controlling the memory for error checking and automatic correction.

The error correcting and outputting section 60 includes a FIFO module for reading the stored image signal, a parity-bit generator 64 for generating the 5 parity bits and the 3 error information bits from the 24-bit original image data of the 32-bit image signal, an error-bit detection-correction module 66 for detecting and automatically correcting the error of the image signal by using the parity bits and the error information bits pre-generated from the image receiving and converting section 20 and the parity bits and the error information bits re-generated from the parity-bit generator 64, a digital television (DTV) address generator 68 for generating an address signal for outputting the error-corrected image signal as the digital TV image, a DTV sync generator 70 for generating a sync signal for outputting the digital TV image, and an interpolation processing module 72 for adjusting the image signal to match the 16:9 aspect ratio of the digital TV.

The operation of the apparatus for image conversion and automatic error correction for a digital TV according to the present invention will be explained.

First, the digital image signal converter 24, if the 24-bit digital image data (RGB) outputted from the graphic chip of a general TV or the graphic module connected from the computer to the monitor is inputted, converts the RGB image data into the digital YPbPr signal for the digital TV system using a 1:1 matrix conversion, and the parity-bit generation and data arrangement processing module 22 generates and rearranges the 24-bit image data converted into the YPbPr signal, 5 parity bits, and 3 error information bits.

At this time, the graphic address generator 26 generates an address signal for receiving and storing the sync signal.

The 32-bit image signal converted and rearranged is stored in the first and second 32-bit memory banks 46 and 48 through the FIFO module 28 and the memory controller 42. Meanwhile, the signal arbitrator 44 serves to execute one among the inputted control signals.

Next, the 32-bit image signal stored in the first and second memory banks 46 and 48 is read out, and the error detection and correction is performed. That is, the stored 32-bit image signal is read out through the memory controller 50 and the FIFO module 62, and the 5 parity bits and the 3 error information bits are re-generated from the 24-bit image data of the 32-bit image signal by the parity-bit generator 64. The reason why the parity bits and the error information bits are re-generated is to check and correct again the error generated during the transmission.

The error-bit detection-correction module 66 performs the error detection and correction by XOR-gating the parity bits and the error information bits generated by the parity-bit generation and data arrangement module 22 and stored in the first and second memory banks 46 and 48 and the parity bits and the error information bits re-generated by the parity-bit generator 64.

The image signal corrected and outputted from the error-bit detection-correction module 66 is transmitted to the interpolation processing module 72, which performs an interpolation processing to change the image signal to match the 16:9 aspect ratio suitable for the digital TV. The DTV address generator 68 generates an address signal for outputting the error-corrected image signal as the digital TV image, and the DTV sync generator 70 generates the sync signal for outputting the digital TV image, and transmits the sync signal to the digital TV to display the image on a screen of the digital TV.

Meanwhile, FIGS. 2$a$ and 2$b$ show the structure of the image signal according to the present invention.

As shown in FIG. 2$a$, the 32-bit image signal is composed of graphic data bits D0~D23, which comprise the 24-bit image data, 5 parity bits P0~P4, and 3 error information bits N0~N2.

FIG. 2$b$ shows the table whereby the 32-bit image signal is stored in the first and second memory banks 46 and 48.

Meanwhile, the parity-bit generation and data arrangement module 22 generates the parity bits from the 24-bit image data using XOR gates as shown in FIG. 3. The parity bits are 5 bits and are denoted as P0~P4.

For example, the parity bit P0 is generated by XOR-gating the 24-bit image data, that is, P0=XOR(Data0, Data1, Data3, Data4, Data6, Data8, Data10, Data11, Data13, Data15, Data17, Data19, Data21, Data23). Also, P1 to P4 are obtained as follows.

P1=XOR(Data0, Data2, Data3, Data5, Data6, Data9, Data10, Data12, Data13, Data16, Data17, Data20, Data21)

P2=XOR(Data1, Data2, Data3, Data7, Data8, Data9, Data10, Data14, Data15, Data16, Data17, Data22, Data23)

P3=XOR(Data4, Data5, Data6, Data7, Data8, Data9, Data10, Data18, Data19, Data20, Data21, Data22, Data23)

P4=XOR(Data11, Data12, Data13, Data14, Data15, Data16, Data17, Data18, Data19, Data20, Data21, Data22, Data23)

As described above, if the 24-bit image data is received, the parity-bit generation and data arrangement module 22 computes the parity bits P0, P1, P2, P3 and P4 using the XOR gates.

Also, as shown in FIG. 4, the parity-bit generation and data arrangement module 22 generates the three error information bits by XOR-gating the 24-bit image data and the 5 parity bits. The error information bits are denoted as N0~N2.

N0=XOR(Data23, Data22, Data21, Data20, Data19, Data18)

N1=XOR(Data17, Data16, Data15, Data14, Data13, Data12, Data11, Data10, Data9)

N2=XOR(Data8, Data7, Data6, Data5, Data4, Data3, Data2, Data1, Data0, P4, P3, P2, P1, P0)

That is, the 3 error information bits are computed by XOR-gating the 24-bit image data and the 5 parity bits.

As described above, if the 24-bit image data is received, the parity-bit generation and data arrangement module 22 generates the 5 parity bits and the 3 error information bits, and stores the parity bits and the error information bits in the first and second memory banks 46 and 48.

Meanwhile, the parity-bit generator 64 receives the 32-bit image signal stored in the first and second memory banks 46 and 48, and re-generates the parity bits and the error information bits generated by the parity-bit generation and data arrangement module 22 from the 24-bit original image data. The parity bits generated from the parity-bit generator 64 is denoted by P0'~P4', and the error information bits N0'~N2'. In other words, the parity-bit generator 64 re-computes the 5 parity bits P0'~P4' and the 3 error information bits N0'~N2' using the 24-bit original image data. This is for detecting and correcting the error that may be produced during transmission/reception of the image data.

The error-bit detection-correction module 66 obtains parity values by XOR-gating the parity bits P0~P4 and the error information bits N0~N2 computed by the parity-bit generation and data arrangement module 22 and the parity bits P0'~P4' and the error information bits N0'~N2' re-computed by the parity-bit generator 64 with respect to the original image data, and corrects the error of the corresponding bits where the error is produced.

First, S0=XOR(P0, P0'), S1=XOR(P1, P1'), S2=XOR(P2, P2'), S3=XOR(P3, P3'), and S4=XOR(P4, P4') are computed, and then the parity values are obtained with reference to the table.

The corresponding bits where the error is produced are corrected by the computed parity values.

Next, SS0=XOR(N0, N0'), SS1=XOR(N1, N1'), and SS2=XOR(N2, N2') are computed. By this computation, the double error, the triple error, and the error beyond the triple error can be detected. The double error, the triple error, and the error beyond the triple error are outputted as they are without any correction, and this is for preventing the deterioration of the picture quality due to a wrong correction. This is because the picture quality becomes better in case that correction is not made with respect to the image data where many errors are produced.

FIG. 5 shows a table of resultant values of error detection from the 24-bit image data using the parity bits and the error information bits according to the present invention. As shown in the table, the correction is not made with respect to the image data where the double or triple error is produced, and thus the deterioration of the picture quality due to the wrong correction can be prevented.

Figure 6:
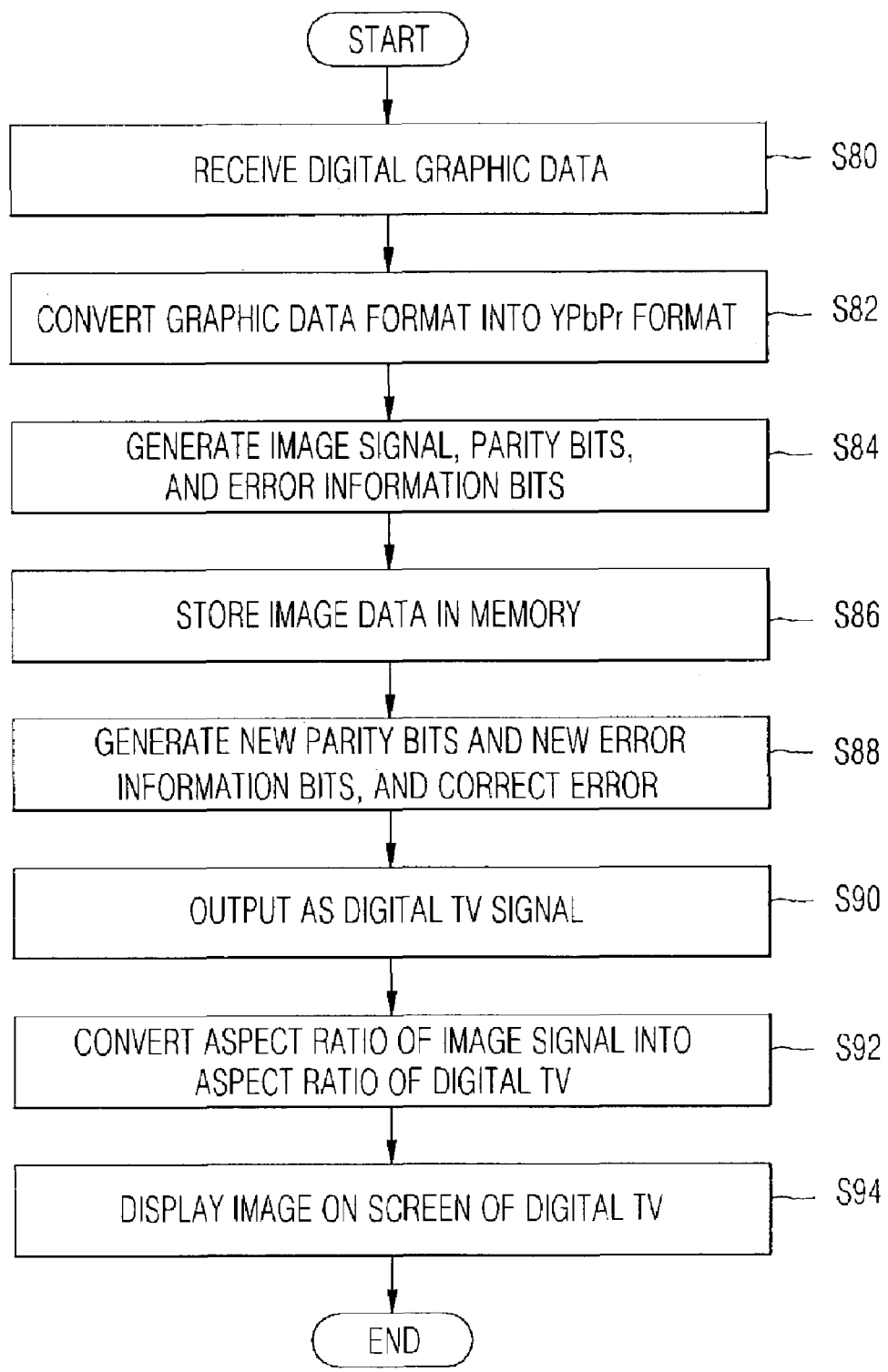
FIG. 6 is a flowchart illustrating a method for image conversion and automatic error correction for a digital TV according to the present invention.

Meanwhile, FIG. 6 is a flowchart illustrating a method for image conversion from the digital RGB image data into the digital YPbPr signal and automatic error correction of the image signal according to the present invention.

First, if the digital RGB graphic data is received, the digital image signal converter 24 converts the format of the data into the format of the digital YPbPR signal, and the parity-bit generation and data arrangement module 22 generates the 5 parity bits P0~P4 and the 3 error information bits N0~N2 from the 24-bit image data using the XOR gates (steps S80, S82 and S84).

At this time, the graphic address generator 26 receives the sync signal, and generates the address for the storage.

The 32-bit image signal converted and rearranged is stored in the first and second 32-bit memory banks 46 and 48 through the FIFO module 28 and the memory controller 42 (step S86).

Next, the stored 32-bit image signal is read out through the memory controller 50 and the FIFO module 62 and the 5 parity bits P0'~P4' are generated by XOR-gating the 24-bit image data, and then the 3 error information bits N0'~N2' are produced.

At the error correction step, the error-bit detection-correction module 66 obtains the parity values XOR-gating the parity bits P0~P4 and the error information bits N0~N2 computed by the parity-bit generation and data arrangement module 22 and the parity bits P0'~P4' and the error information bits N0'~N2' re-generated by the parity-bit generator 64 with respect to the original image data.

First, S0=XOR(P0, P0'), S1=XOR(P1, P1'), S2=XOR(P2, P2'), S3=XOR(P3, P3'), and S4=XOR(P4, P4') are computed, and then the parity values are obtained with reference to the table.

The corresponding bits where the error is produced are corrected by the computed parity values (step S88). At this time, the corresponding bits where many errors are produced are outputted as they are without any correction, and as described above, this is for preventing the deterioration of the picture quality due to a wrong correction.

The image signal corrected and outputted from the error-bit detection-correction module 66 is transmitted to the interpolation processing module 72, and the interpolation processing module 72 performs an interpolation processing to change the 4:3 aspect ratio to the 16:9 aspect ratio suitable for the digital TV. The DTV address generator 68 generates an address signal for outputting the error-corrected image signal as the digital TV image, and the DTV sync generator 70 generates the sync signal for outputting the digital TV image and transmits the sync signal to the digital TV to display the image on the screen of the digital TV (steps S90, S92 and S94).

In the present invention, the image data means the 24-bit image, and the 32-bit image signal is composed of the 24-bit image data, 5 parity bits, and 3 error information bits.

As described above, the present invention can provide an improved picture quality by performing an image signal conversion and an automatic error correction when a set top box of the digital TV converts a graphic signal of a general TV into a signal of the digital TV, when an Internet TV, which can simultaneously perform functions of the digital TV and the Internet, converts an image provided from the Internet TV to the Internet into an image that can be viewed in the digital TV, or when the signal conversion is required to integrate a PC, DVD, etc., having the RGB image format.

Also, according to the present invention, the double error, the triple error, and the error beyond the triple error are detected during the automatic error correction of the image signal, and they are outputted without any correction to prevent the deterioration of the picture quality due to a wrong correction.

While the present invention has been described and illustrated herein with reference to the preferred embodiment thereof, it will be understood by those skilled in the art that various changes and modifications may be made to the invention without departing from the spirit and scope of the invention, which is defined in the appended claims.

What is claimed is:

1. An apparatus for image conversion and automatic error correction for a digital television receiver (TV) comprising:
   an image receiving and converting section for converting received RGB image data into image data of a digital TV format and rearranging parity bits and error information bits produced from the converted image data to form one image signal;
   a storage and image providing section for receiving the image signal from the image receiving and converting section, storing the image signal in a memory bank and providing the image signal so as to detect and correct an error produced in the image signal; and
   an error correcting and outputting section for receiving the image signal from the storage and image providing section, correcting the error by computing the parity bits and the error information bits from the original image data of the image signal, and interpolating the image to match a 16:9 aspect ratio for the digital TV.

2. The apparatus as claimed in claim 1, wherein the image receiving and converting section comprises:
   a digital image signal converter for converting the input RGB image data into the YPbPr image data to match the digital TV format by using a matrix conversion;
   a parity-bit generation and data arrangement module for generating the parity bits by computing the image data if the image data is received from the digital image signal converter, generating the error information bits by computing the image data and the parity bits, and rearranging one image signal by the parity bits and the error information bits; and
   a graphic address generator for generating an address signal for storing the image signal in the memory.

3. The apparatus as claimed in claim 1, wherein the storage and image providing section comprises:
   a memory controller for controlling storage and output of the image signal;
   a memory bank for storing the image signal, and providing the image signal according to a signal inputted thereto; and
   a signal arbitrator for selecting and outputting one among a plurality of input signals if a control signal is received.

4. The apparatus as claimed in claim 1, wherein the error correcting and outputting section comprises:
   a first-in first-out (FIFO) module for interface for receiving the image signal;
   a parity-bit generator for receiving the image signal from the FIFO module and generating specified parity bits and error information bits from the image data;
   an error-bit detection-correction module for correcting the error of the image signal by computing the parity bits and the error information bits generated from the parity-bit generator and the parity bits and the error information bits generated from the image receiving and converting section;

an interpolation processing module for receiving the corrected image signal from the error-bit detection-correction module and converting the image signal to match the aspect ratio of the digital TV;

a digital TV address generator for generating an address signal for outputting the error-corrected image signal to the digital TV; and a sync generator for generating a sync signal to be outputted to the digital TV.

5. The apparatus as claimed in claim 4, wherein the error-bit detection-correction module obtains parity values by computing the parity bits generated from the image receiving and converting section and the parity bits generated from the parity-bit generator, and correcting corresponding bits of the image data where the error is produced according to the parity values; and wherein the error-bit detection-correction module detects the corresponding bits where many errors are produced by computing the error information bits generated from the image receiving and converting section and the error information bits generated from the parity-bit generator.

6. A method for image conversion and automatic error correction for a digital television receiver (TV) comprising:

a first step of receiving and converting image data of an RGB format into image data of an YPbPr format that is a digital TV format by a matrix conversion;

a second step of generating parity bits and error information bits from the image data and storing the parity bits and the error information bits;

a third step of reading the stored image signal through a memory controller;

a fourth step of regenerating parity bits and error information bits from the image data of the image signal;

a fifth step of obtaining parity values by computing the parity bits and the error information bits generated at the second step and the parity bits and the error information bits generated at the fourth step and correcting an error of a corresponding bit by the obtained parity values, and a sixth step of outputting the image signal error-corrected at the fifth step to the digital TV.

7. The method as claimed in claim 6, wherein the second step of generating and storing the parity bits and the error information bits from the image data comprises the steps of:

generating the parity bits by computing the image data;

generating the error information bits by computing again the image data and the parity bits; and storing the image data, the parity bits, and the error information bits in the memory bank through the memory controller.

8. The method as claimed in claim 6, wherein the fourth step of regenerating the parity bits and the error information bits from the image data of the image signal comprises the steps of:

generating the parity bits by computing the image data; and generating the error information bits by computing again the image data and the parity bits.

9. The method as claimed in claim 6, wherein the sixth step of outputting the image signal error-corrected at the fifth step to the digital TV comprises the steps of:

interpolating the image signal with an aspect ratio of the digital TV; and generating the address and the sync signal to be outputted to the digital TV.

* * * * *